Jan. 9, 1968   H. HORA   3,362,285
METHOD OF EFFECTING CORRECTION IN AN OPTICAL SYSTEM
Filed March 20, 1964

Inventor:
Heinrich Hora
By: Spencer & Kaye
ATTORNEYS

United States Patent Office 3,362,285
Patented Jan. 9, 1968

3,362,285
METHOD OF EFFECTING CORRECTION IN AN OPTICAL SYSTEM
Heinrich Hora, Garching, Germany, assignor to Institut fur Plasmaphysik Gesellschaft mit beschrankter Haftung, Munich-Garching, Germany
Filed Mar. 20, 1964, Ser. No. 353,527
Claims priority, application Germany, Mar. 22, 1963, J 23,410
5 Claims. (Cl. 88—14)

ABSTRACT OF THE DISCLOSURE

A method of matching a boundary surface in an optical system to the shape of any equiphase surface of a wave front passing out of the boundary surface. An image is produced which shows the phase errors or differences in the wave front passing through the uncorrected boundary surface in the form of variations in intensity. This intensity image is then projected back onto a layer bounding the boundary surface, the solubility characteristics of which can be varied by irradiation. Using the illuminated layer as a control, material is selectively dissolved away in such a manner that the resultant new boundary surface corresponds more closely with the equiphase surface.

---

Figure 1:
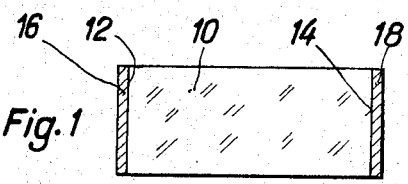

The present invention relates to a method of effecting correction in an optical system, in particular to a method of matching one boundary surface of an optical system to the shape of the equiphase surface of a wave front passing through said boundary surface. A preferred field of application of the invention, albeit not the only one, is in the manufacture of solid-state lasers.

In determining the properties of boundary surfaces delimiting optical systems, i.e. of surfaces formed at the points of contact of media having different refractive indices, it is generally a prerequisite that the media from which the optical system is formed are in themselves substantially homogeneous. The materials used for optical applications, such as glasses or crystals, are, in practice, however, never ideally homogeneous. The properties of an optical system therefore deviate further from the theoretical values than the dimensional tolerances would lead one to expect.

The effects of inhomogeneities are the more apparent the greater the number of occasions upon which one and the same light ray passes through them. An instance of this principle is available in the form of a solid-state laser, the active optical system in which as is well known corresponds to a Perot-Fabry Interferometer.

The construction and principle of operation of a solid-state laser can be considered as sufficiently known so that we can proceed directly to a more detail discussion of the questions involved with the subject of the invention.

The active optical element in a solid-state laser is a doped solid, for example a ruby crystal, which is arranged between a 100% reflective mirror and a non-absorptive 95 to 99% reflective mirror. Ideally, the mirrors will be plane-parallel and a wave whose front is disposed parallel to the mirrors will be reflected from one to the other and back again a very large number of times. Waves in any other direction will leave the system after only a few reflections.

In the crystal, as a consequence of the doping, higher energy terms are present in addition to the basic terms and electrons can be raised to this higher level by being supplied with energy from an external source. On transfer of the excited electrons from the higher level to the basic level, radiation of specific wavelength is emitted, e.g. in the case of a ruby laser red light is emitted. As with luminescense however, the transfer probability is relatively low. Transfer from the excited terms to the basic terms can, however, be "stimulated" by radiation of the same wavelength as the transfer wavelength. If a wave of the particular wavelength concerned moves through the crystal, then it results in stimulated emission causing an exponential increase in intensity if sufficient excited electrons are available. If this is the case, then light of very small apertural angle and spectral width leaves the system through the partially transparent mirror.

As is well known, however, the light leaves the partially transparent mirror at very high intensity at specific locations and at lower intensity at other locations. The reason for this is that the optical paths taken by the light vary due to slight inhomogeneities in the crystal, even though the mirrors are adequately plane parallel. It is well known that more uniform light emission can be achieved if the surface of the partially transparent mirror is not ground flat, instead an effort being made to adapt it to the shape of the equiphase surface of the wave arriving from the fully reflecting mirror. The crystal face carrying the partially transparent mirror is suitably ground down to this end. Since the ruby frequently used as the crystal in these systems, is very difficult to work because of its great hardness, the method is known whereby a further material of very nearly the same refractive index as the crystal is applied to the latter's surface and is ground to shape instead.

The above methods of correction are above all open to the objection that in order to determine the location and amount of the material to be removed, extremely complex apparatus is required, in practice complicated interferometers being employed, and that even where the material is soft selective removal is laborious and only possible if extremely precise control of the mechanism used can be effected.

The invention now proposes a considerably simpler method in which, using photographic and chemical means, the appropriate surface of a laser crystal or the like can be corrected in such a manner that it has a shape corresponding to the equiphase surface of a wave front passing through it.

In accordance with the invention, a method of matching a boundary surface of an optical system to the shape of an equiphase surface of a wave front passing through said boundary surface, is characterised in that an image of the boundary surface is produced which shows the phase errors or differences in the wave front passing through the uncorrected boundary surface in the form of variations in intensity; in that this intensity image is then projected back onto a layer bounding the boundary surface, the solubility characteristics of which can be varied by irradiation; and in that using the illuminated layer as a control, material is selectively dissolved away in such a manner that the resultant new boundary surface corresponds more closely with the equiphase surface than the uncorrected boundary surface.

Substances the solubility of which varies when irradiated with light of specific wavelength, are already known, for instance light-sensitive etch-resistant layers (Kodak's "photoresist") or so-called photo-glass.

The radiation-sensitive layer can be part of the optical system or can be used merely as an etch-resistant layer.

The invention will now be explained more particularly making reference to the preferred field of application, namely the manufacture of solid-state lasers, reference being made to the drawing.

Figure 2:
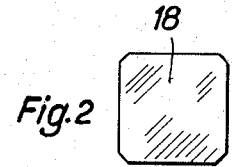
Figure 3:
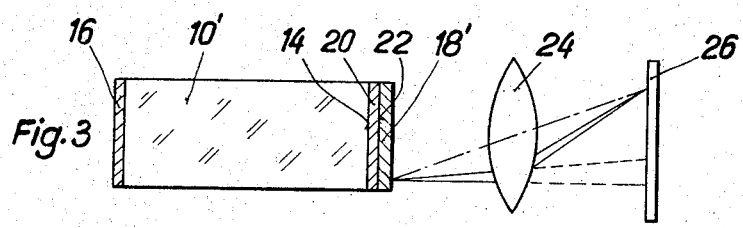
Figure 4:
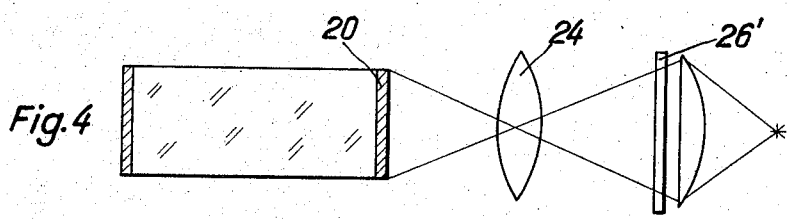
Figure 5:
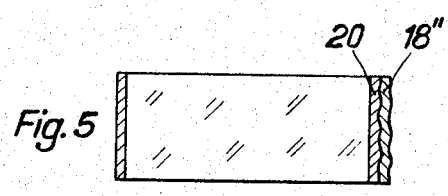

FIGURE 1 is a longitudinal section through a laser crystal.
FIGURE 2 is an end view of the crystal of FIGURE 1.
FIGURES 3 to 5 are schematic illustrations of an embodiment of the invention in various stages of processing.

FIGURE 1 illustrates a laser crystal 10 which may, for example, be constituted by a highly doped cylindrical ruby crystal whose end faces 12, 14 are ground plane-parallel with one another. The end face 12 is provided with a 100% reflective mirror 16, the end face 14 with a 95 to 99% reflective non-absorptive mirror 18. The devices other than the arrangement required, needed for the operation of a solid-state laser, can be designed on conventional lines and are not illustrated in the drawing since they do not contribute to the understanding of the present invention.

FIGURE 2 shows an example of a non-uniform intensity distribution in a light beam emerging through the partially transparent mirror 18. Here, the shaded portions can be taken to indicate regions of lower light intensity.

These errors, traceable to minor points of inhomogeneity in the crystal (fluctuating refractive index), can in accordance with the invention be quite simply corrected in the following manner.

With the method proposed in accordance with the invention and described in the following, it is assumed that the crystal 10 is a ruby, emitting red light. In this instance, the invention can be put into practice quite simply by making use of the fact that the etch-resistant layers at present commercially available are sensitive more or less exclusively to shortwave light, not however to the red light emitted by this crystal.

As FIGURE 3 shows, firstly the end face 14' of the crystal 10', which face need not necessarily be ground absolutely flat, is covered with a transparent layer 20 the solubility of which in certain solvents alters under irradiation by short wave light, being however insensitive to the red light emitted by the laser. The surface 22 of the layer 20 is then ground flat and provided with a low transparency non-absorbent mirror 18' by a vaporising process.

The thus completed assembly is then inserted in a laser system, not shown, and the crystal 10' is excited to stimulated emission. The surface of the mirror 18' is displayed through the agency of an optical system 24 on a photographic layer 26, for instance a plate or film, so that on this an image develops reproducing the intensity distribution in the light beam passing through the mirror 18'. In principle, because of the very small apertural angle of the laser beam, the reproduction of the crystal end face on the photographic layer can be effected without any optical means. However, if this were done the image would be somewhat less sharp and not reversed as is the case when using the optical system 24; also, approximately the ray path indicated in broken-line in FIGURE 3 would be obtained for a beam emanating from a point on the end face of the crystal (the apertural angle has been exaggerated for the sake of clarity). Then, however, on projecting back one would either have to use a beam of very small apertural angle (the homogeneous beam 2) or an optical system giving double image formation without reversal.

The mirror 18' is now removed, for instance peeled away, and the photographic layer 26 developed and fixed.

As FIGURE 4 schematically illustrates, the intensity image produced on the developed layer 26' is projected back onto the layer using light to which the layer 20 is sensitive. Light intensity, exposure time, strength of the solvent and time of action of the latter are all so selected that the more soluble regions of the layer are dissolved away to a depth of some few tenths of a mu. The exact conditions for any particular case are best determined empirically.

The surface of the etched layer is rinsed, dried and then again has vaporised onto it a non-absorptive mirror of high reflective power, as FIGURE 5 shows. The thus corrected crystal, when stimulated emission takes place, has then a more or less uniformly illuminated exit surface.

The method described above can be modified in the widest possible sense. For instance, the stages in the process such as reducing an intensity image, projecting this intensity image back onto the radiation-sensitive layer and etching away this layer, can be repeated several times, exposure and etching being so controlled that in each case only partial correction is effected.

Instead of the light-sensitive layer referred to in the above example remaining in the crystal to form a part of the optical system, it can be employed as an etch-resistant layer to directly etch away the crystal. This is above all required when the light employed to produce the intensity image lies within the range of sensitivity of the radiation-sensitive layer.

The invention can also be applied to the correction of optical systems other than lasers, for instance to the correction of photographic lenses. Test procedures for photographic lenses are known in which an intensity image is produced corresponding to an equiphase surface similar in nature to the surface described above in connection with laser crystals. By means of a process similar to that described in the foregoing, this intensity image can be employed to alter the shape of the outer surface of the foremost or hindmost lense in order to correct any error (aberration).

The method is applicable to reflecting or mirrored surfaces.

I claim:

1. Method of matching a boundary surface in an optical system to the shape of an equiphase surface of a wave front passing out of said boundary surface, characterised in that an image of the boundary surface is produced which shows the phase errors or differences in the wave front passing through the uncorrected boundary surface in the form of variations in intensity; in that this intensity image is then projected back onto a layer bounding the boundary surface, the solubility characteristics of which can be varied by irradiation; and in that using the illuminated layer as a control, material is selectively dissolved away in such a manner that the resultant new boundary surface corresponds more closely with the equiphase surface.

2. A method as claimed in claim 1, characterised in that the boundary surface is formed from the surface of a material the solubility of which alters under the influence of radiation in a certain part of the spectrum.

3. Method as claimed in claim 1, characterised in that the boundary surface is coated with an etch-resistant radiation-sensitive layer; in that after exposure to the intensity image the more soluble portions of the etch-resistant layer are removed; and in that the most exposed portions of the boundary surface are etched away using a suitable solvent.

4. Method as claimed in claim 2, for the correction of a laser crystal one end face of which is provided with a 100% reflective mirror, characterised in that to the other end face a layer 20 is applied whose solubility alters under the influence of radiation of a wavelength situated in a different range of the spectrum to the radiation emitted by the laser crystal; in that the surface of this layer is ground flat; in that a partially transparent mirror is applied to the flat surface of the layer; in that the crystal is excited to stimulated emission; in that a projectable image of the intensity distribution of the laser radiation passing through the partially transparent mirror is produced; in that the partially transparent mirror is removed; in that the intensity image is projected back onto the radiation-sensitive layer; in that after exposure, the soluble portions of the radiation-sensitive layer are dissolved away to such a depth that the resultant surface approximates more closely to the equiphase surface of the wave front emerging from the particular end face of the laser; in that the etched out layer is cleansed and dried; and in that a non-absorptive mirror of high reflective power is applied to the dried layer.

5. Method as claimed in claim 4, characterised in that the layer is only dissolved away to a depth sufficient to effect partial correction; and in that the stages of producing an intensity image, projecting this back onto the layer and dissolving away the layer, are repeated several times, on each occasion only a small amount of the layer being dissolved away to effect a partial correction.

No references cited.

JEWELL H. PEDERSEN, *Primary Examiner.*

W. L. SIKES, *Assistant Examiner.*